UNITED STATES PATENT OFFICE.

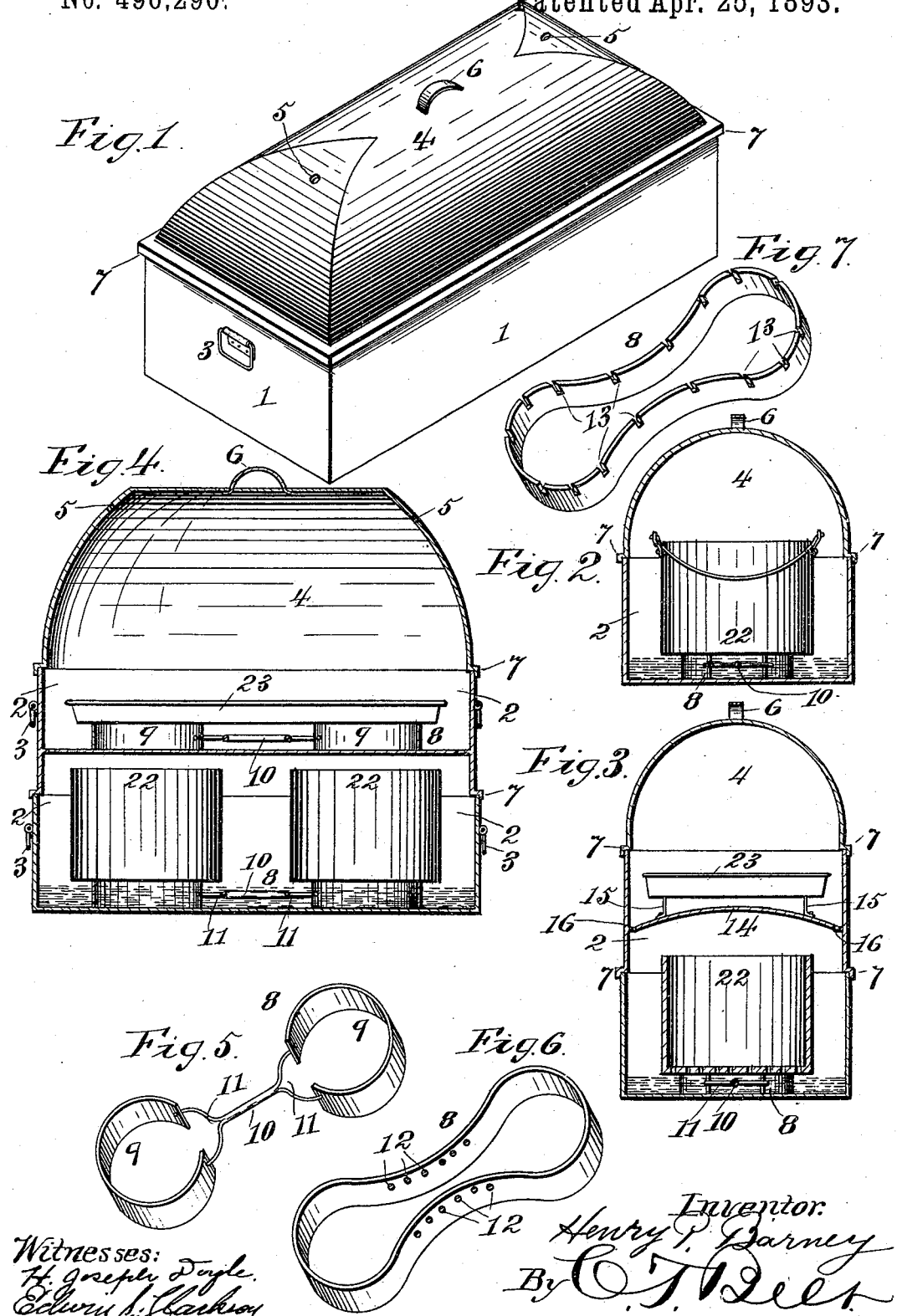

HENRY P. BARNEY, OF THE DISTRICT OF COLUMBIA.

STEAM-COOKER.

SPECIFICATION forming part of Letters Patent No. 496,290, dated April 25, 1893.

Application filed December 24, 1892. Serial No. 456,253. (No model.)

*To all whom it may concern:*

Be it known that I, HENRY P. BARNEY, of the District of Columbia, have invented certain new and useful Improvements in Steam-Cookers, of which the following is a specification.

This invention relates to the class of stoves and furnaces and particularly to a steam cooker, and its novelty will be fully understood from the following description, and claims when taken in connection with the annexed drawings; and the object of the invention is to provide a dry steam domestic steamer or cooker of simple, cheap, and durable construction, which will bake, boil, and roast separately or at the same time.

A further object of the invention is to provide a steamer of this character with a removable support or rest, for the cooking utensils, of such novel construction that it will promote the radiation of steam beneath the utensils which it supports, to great advantage.

In the accompanying drawings forming part of this application; Figure 1 is a perspective view of my steamer ready for use. Fig. 2 is a cross section thereof. Fig. 3 is a cross section of a steam cooker, embodying my improvements, having two compartments separated by an arched or curved partition. Fig. 4 is a longitudinal section of the same form of steamer, showing the two compartments separated by a straight partition. Fig. 5 is a perspective view of my utensil support or rest, and Figs. 6 and 7 are modifications thereof.

The same reference numerals denote the same parts through the several figures of the drawings.

The main body or casing 1 of the steamer is constructed preferably in rectangular form, but it may be made in any other form, with as many compartments as desired, said compartments having the same exterior appearance as to width and length as the steamer with the single compartment. Each section 2 of the steamer has a handle 3 to lift such sections from each other and from the top of a stove. Whether the steamer has one or more compartments it is provided with the cover 4 having one or more apertures 5, and a handle 6. This cover like the sections is set upon the section below, by means of a flange 7 formed on the cover and the sections. In the cross section of Fig. 1 (Fig. 2) I have shown a boiler or bucket 22 but this may be removed and a pan 23 or other utensil placed in its stead.

The support or rest 8 for the cooking utensils is constructed preferably as shown in Fig. 5, having two end pieces 9 of sheet metal curved to form nearly a complete circle, the said ends being connected or joined together by an iron rod 10, having two forked ends 11, which are attached to the ends 9. The steam made in the ends 9 of this support is left perfectly free to radiate back and forth through the openings in said ends, and it at the same time furnishes a most complete and rigid support, for any kind of cooking utensil. In the modification of this support as shown in Fig. 6, it is formed all of one piece of sheet metal having apertures 12 made through each side of its central portion. The apertures provide ready escape for the steam made inside the support 8 when a cooking utensil covers the surface of the said support, or when a narrow vessel is placed thereon. As shown in Fig. 7 the top edge of the support is provided with a series of notches 13. This form of support may be used when a large or wide vessel is supported, so that the steam may radiate freely over its entire bottom.

In the form of steamer shown in Fig. 3 of the drawings the top section is provided with an arched or curved partition 14 having legs or feet 15 upon which the pan 23 is supported, and a series of apertures 16, for the purpose of allowing the condensed steam as it falls upon the arched partition to run off with the water in the bottom section. A straight partition may also be used, as shown in Fig. 4, and the support 8 placed thereon just the same as in the bottom section, to hold a baking pan.

It will be observed that in consequence of the ample space above the utensils furnished by the covers, the steam will condense and run down the sides to the water without dropping into the said utensils. The support being separate from the bottom of the steamer is free to be moved about in the water and to be entirely removed therefrom for cleaning, &c.

Although I have not shown a steamer formed of more than two sections, any number of sections may be employed, so as to boil, bake, and roast all at the same time.

Having thus described my invention, what I claim as new, and desire to secure by Letters Patent, is—

1. In a domestic steamer, the bottom section, the top section covering the bottom section, the arched partition with which the top section is provided, said partition having legs or feet, and a series of apertures for the circulation of steam between the two sections, and the cover inclosing the top section, substantially as shown and described.

2. The combination with a domestic steamer, of a support for the utensils contained in the steamer comprising two sheet metal circular pieces, and a metal rod having two forked ends secured to and connecting said circular pieces, substantially as shown and described.

In witness whereof I hereunto set my hand in the presence of two witnesses.

HENRY P. BARNEY.

Witnesses:
H. JOSEPH DOYLE,
M. DORIAN.